United States Patent
Weber

(10) Patent No.: US 6,552,504 B2
(45) Date of Patent: Apr. 22, 2003

(54) DEFLECTION CIRCUIT WITH A FEEDBACK CONTROLLED CAPACITIVE TRANSFORMATION

(75) Inventor: Rudy Weber, Meilen (CH)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/892,115

(22) Filed: Jun. 26, 2001

(65) Prior Publication Data

US 2002/0060532 A1 May 23, 2002

Related U.S. Application Data

(60) Provisional application No. 60/228,231, filed on Aug. 25, 2000.

(51) Int. Cl.[7] ............................................. H01J 29/70
(52) U.S. Cl. ........................ 315/408; 315/364; 315/399
(58) Field of Search ............................... 315/364, 371, 315/387, 399, 408, 411, 388, 389, 390; H01J 29/70

(56) References Cited

U.S. PATENT DOCUMENTS

| | | | | |
|---|---|---|---|---|
| 4,081,721 A | * | 3/1978 | Haferl ........................ | 315/389 |
| 4,088,931 A | * | 5/1978 | Haferl ........................ | 315/371 |
| 4,147,964 A | | 4/1979 | Luz et al. ................... | 315/411 |
| 4,206,388 A | | 6/1980 | Ishigaki et al. ............. | 315/371 |
| 4,242,714 A | | 12/1980 | Yoshida et al. ............. | 361/152 |
| 4,513,228 A | | 4/1985 | Teuling ...................... | 315/408 |
| 4,540,933 A | | 9/1985 | Teuling ...................... | 323/271 |
| 4,547,708 A | * | 10/1985 | Haferl ........................ | 315/371 |
| 4,733,141 A | | 3/1988 | Watanuki .................... | 315/371 |
| 4,837,457 A | | 6/1989 | Bergstrom et al. .......... | 307/253 |
| 4,864,197 A | | 9/1989 | Fitzgerald ................... | 315/408 |
| 5,010,281 A | * | 4/1991 | Rodriguez-Cavazos ..... | 315/411 |
| 5,355,058 A | * | 10/1994 | Jackson et al. ............. | 315/367 |
| 5,416,389 A | | 5/1995 | Merlo et al. ................ | 315/370 |
| 5,444,338 A | * | 8/1995 | George et al. .............. | 315/371 |
| 5,463,290 A | * | 10/1995 | Fitzgerald ................... | 315/411 |
| 5,466,993 A | * | 11/1995 | Leaver ........................ | 315/387 |
| 5,469,029 A | * | 11/1995 | Jackson et al. ............. | 315/408 |
| 5,596,249 A | * | 1/1997 | Ochiai ........................ | 315/371 |
| 5,596,250 A | * | 1/1997 | Truskalo .................... | 315/371 |
| 5,714,849 A | | 2/1998 | Lee ............................. | 315/408 |
| 6,114,817 A | * | 9/2000 | Fernsler ...................... | 315/395 |
| 6,124,686 A | | 9/2000 | Kikuchi et al. ............. | 315/408 |
| 6,479,953 B2 | * | 11/2002 | Weber ......................... | 315/408 |

FOREIGN PATENT DOCUMENTS

JP          10-108034          4/1998       ............ H04N/3/16

* cited by examiner

Primary Examiner—Don Wong
Assistant Examiner—Trinh Vo Dinh
(74) Attorney, Agent, or Firm—Joseph S. Tripoli; Harvey D. Fried; Sammy S. Henig

(57) ABSTRACT

A horizontal deflection circuit includes a first retrace capacitance and a second retrace capacitance. A horizontal deflection winding is coupled to the first and second retrace capacitances to form a resonant circuit, during retrace. A first switching transistor responsive to a first control signal at a horizontal deflection frequency selected from a range of horizontal deflection frequencies and coupled to the first retrace capacitance generates a first retrace pulse voltage in the first retrace capacitance. A second switching transistor responsive to a second control signal is coupled to the second retrace capacitance. A second retrace pulse voltage is generated in the second retrace capacitance. The second retrace pulse voltage is combined with the first retrace pulse voltage to produce a deflection current in the deflection winding. A controllable phase shifter responsive to a feedback signal indicative of a magnitude of a supply current generates the second control signal at a controllable phase with respect to the first control signal to regulate the deflection current amplitude at each of the selected frequencies by retrace capacitance transformation.

7 Claims, 3 Drawing Sheets fH = 31kHz

DEFLECTION CIRCUIT WITH A FEEDBACK CONTROLLED CAPACITIVE TRANSFORMATION

CROSS REFERENCE TO RELATED APPLICATIONS

This application claims priority of U.S. provisional patent application No. 60/228,231 filed Aug. 25, 2000.

The invention relates to a deflection circuit of a cathode ray tube (CRT).

BACKGROUND

A typical horizontal deflection circuit for a CRT includes a horizontal deflection winding of a deflection yoke coupled in parallel with a retrace capacitance provided by, for example, a retrace capacitor. A horizontal output or switching transistor operating at a horizontal deflection frequency is coupled across the retrace capacitor. A supply voltage is coupled to the switching transistor and to the retrace capacitor via a supply inductance.

For a given deflection winding inductance and a supply voltage magnitude, the effective retrace capacitance required to produce the same deflection current amplitude would have to be smaller when a higher deflection frequency is utilised than when a lower deflection frequency is utilised. Therefore, the flyback pulse voltage developed across a horizontal output transistor would have to be higher at the higher deflection frequency. For a given switching transistor breakdown voltage characteristic, the maximum flyback pulse voltage that is permitted to develop across a horizontal output transistor limits the allowable, maximum horizontal frequency that can be utilised. Therefore, it may be desirable to reduce the effective retrace capacitance without substantially increasing the flyback pulse voltage developed across the horizontal output transistor.

A horizontal deflection circuit, embodying an inventive feature, includes switched, first and second retrace capacitors coupled in series with a deflection winding. First and second switching transistors are coupled across the first and second retrace capacitors, respectively. A supply voltage is coupled via a supply inductance to a junction terminal between the retrace capacitors. The switching transistors are switched off, during retrace, to produce a first retrace pulse voltage across the first retrace capacitance and a second retrace pulse voltage across the second retrace capacitance. The retrace pulse voltage across the deflection winding is equal to the sum of a first retrace pulse voltage and the second retrace pulse voltage and is larger than each. The retrace pulse voltage across the deflection winding is proportional to a ratio of the capacitances of the first and second capacitances. Thereby, capacitive transformation is obtained. Similarly, a voltage across an S-shaping capacitor that is coupled in series with the deflection winding is also proportional to a ratio of the capacitances of the first and second capacitances.

Advantageously, the peak voltage developed across each of the switching transistors is substantially smaller than the sum retrace pulse voltage developed across the deflection winding. The result is that, for a given switching transistor breakdown voltage characteristic, the maximum scan frequency that can be employed is, advantageously, higher than in a deflection circuit in which the entire retrace pulse voltage across the deflection winding is developed across a single switching transistor.

In a video display monitor operating at a frequency selected from a wide range of frequencies, embodying an inventive feature, a feedback control circuit is responsive to a feedback signal that is indicative of the average supply current. A feedback control circuit is used for adjusting the switching timing, during retrace, of one of the switching transistors in a feedback loop relative to that of the other one. The switching timing adjustment is made for obtaining, for example, the same supply current at each of the selected deflection frequencies. Because the average supply current is directly related to the average deflection current, the switching timing adjustment achieves, for example, substantially the same deflection current amplitude using the same supply voltage at each selected deflection frequency. Thereby, gross adjustment of the deflection current is obtained at each selected deflection frequency.

SUMMARY OF THE INVENTION

A video display deflection apparatus, embodying an inventive feature, includes a first retrace capacitance and a second retrace capacitance. A deflection winding is coupled to the first and second retrace capacitances to form a resonant circuit, during retrace. A source of a first control signal at a frequency related to a deflection frequency selected from a range of frequencies is provided. A first switching transistor responsive to the first control signal and coupled to said first retrace capacitance is used for generating a first retrace pulse voltage in the first retrace capacitance. A second switching transistor responsive to a second control signal having a variable phase with respect to the first control signal is provided. The second switching transistor is coupled to the second retrace capacitance for generating a second retrace pulse voltage in the second retrace capacitance. The first and the second retrace pulse voltage, are applied to the deflection winding to produce a deflection current in the deflection winding. A controllable phase shifter responsive to a feedback signal, indicative of an amplitude of the deflection current, is provided. The controllable phase shifter is used for varying the phase of the second control signal relative to a phase of the first control signal. A retrace capacitance transformation factor varies in a manner to oppose a tendency of an amplitude of the deflection current to change.

DETAILED DESCRIPTION

Figure 1:
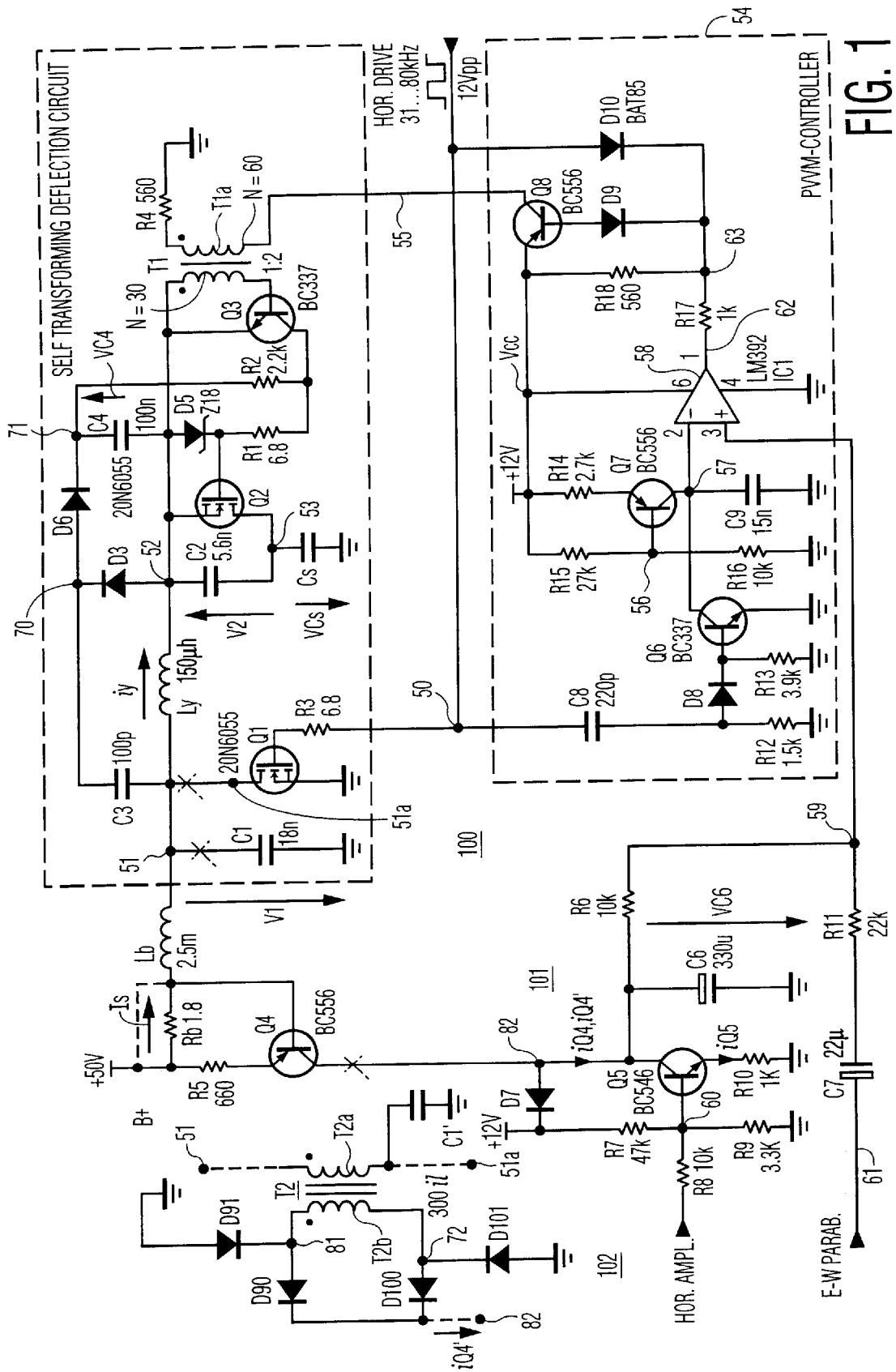
FIG. 1 illustrates a deflection circuit, embodying an inventive feature.

A deflection circuit 100 of FIG. 1 operates at a horizontal deflection frequency fH selected from a wide range of horizontal deflection frequencies between, for example, 31 KHz and 80 KHz. Deflection circuit 100 includes a supply inductor Lb coupled to a source of a supply voltage B+ via a supply current sampling resistor Rb. Inductor Lb is coupled between resistor Rb and a drain electrode of a switching, horizontal output field effect transistor Q1. Transistor Q1 is controlled by a horizontal drive signal 50 having approximately 50% duty cycle. A junction terminal 51 between supply inductor Lb and the drain electrode of transistor Q1 is coupled to a retrace capacitor C1. A deflection winding Ly is coupled between terminal 51 and a terminal 52 of a second retrace capacitor C2. A switching, field effect transistor Q2 is coupled in parallel with capacitor C2. A junction terminal 53, between capacitor C2 and a drain electrode of transistor Q2, is coupled to an S-shaping capacitor Cs for providing S-shaping of a deflection current iy in winding Ly. Capacitor Cs has a value selectable, in accordance with the selected deflection frequency fH, using, for example, switches, not shown, in a conventional manner. For example, when the value of capacitor Cs is 470 nF at fH=31 kHz and 180 nF at fH=80 kHz. The required return recovery current flows via a pair of damper diodes, not shown, each being an integral part of the transistors Q1 and Q2, respectively.

Figure 2A:
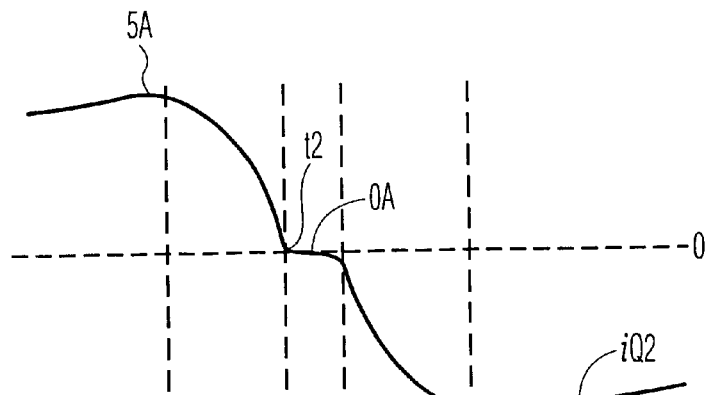
FIGS. 2a, 2b, and 2c illustrate waveforms useful for explaining the operation of the circuit of FIG. 1 at 80 Khz.
Figure 2B:
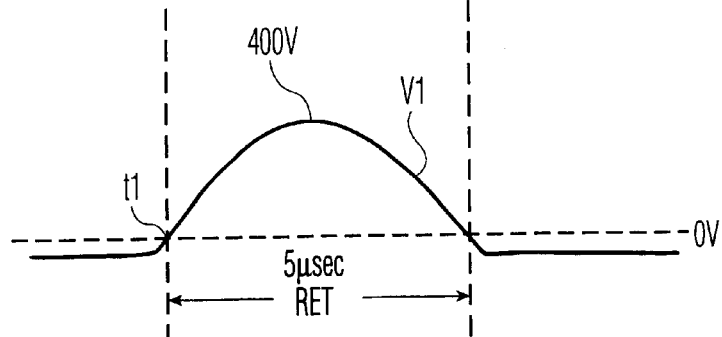
Figure 2C:
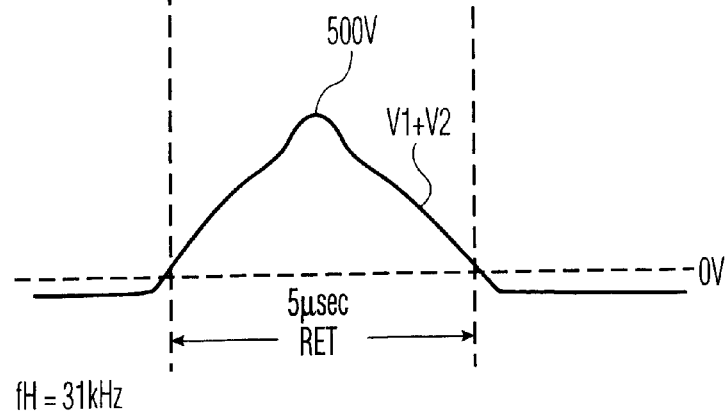
Figure 3A:
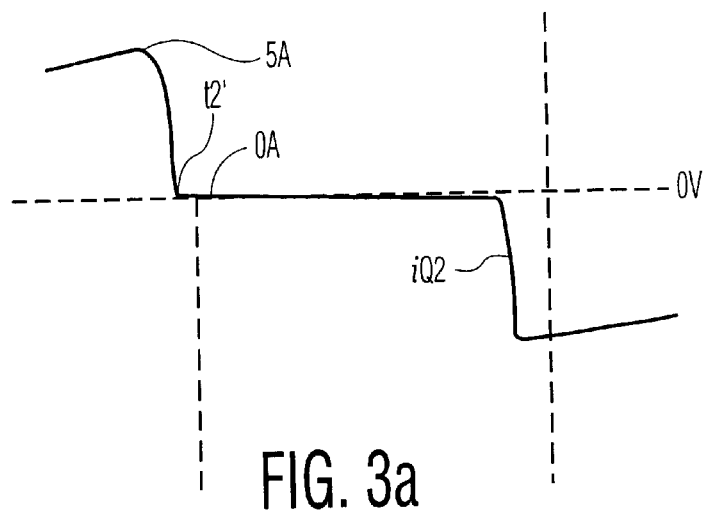
FIGS. 3a, 3b and 3c illustrate waveforms useful for explaining the operation of the circuit of FIG. 1 at 31 kHz.
Figure 3B:
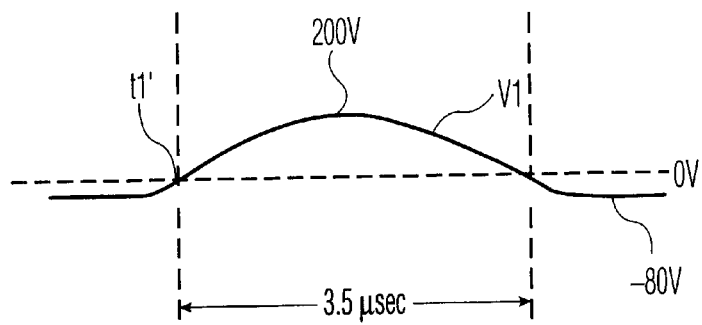
Figure 3C:
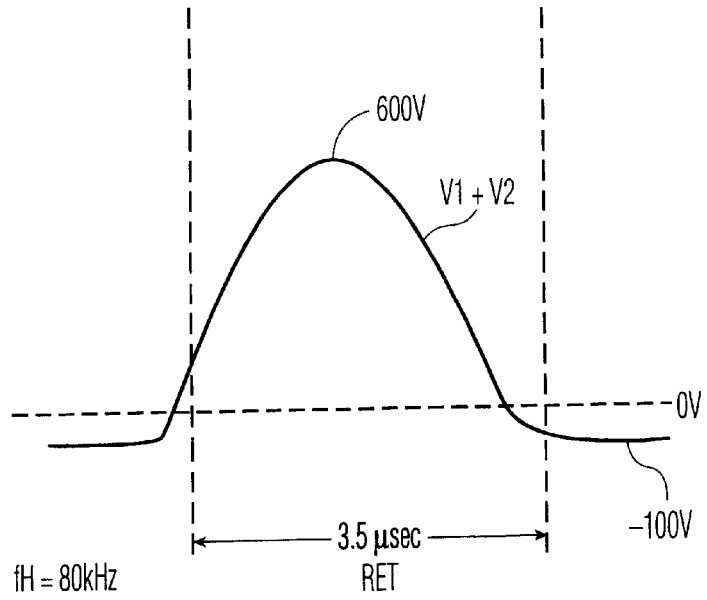

FIGS. 2a–2c illustrate waveforms useful for explaining the operation of the circuit of FIG. 1, when deflection current iy is at a deflection frequency fH of 31 KHz. Similarly, FIGS. 3a–3c illustrate waveforms useful for explaining the operation of the circuit of FIG. 1, when deflection current iy is at a deflection frequency fH of 80 KHz. Similar symbols and numerals in FIGS. 1, 2a–2c and 3a–3c indicate similar items or functions.

During trace, both switching transistors Q1 and Q2 of FIG. 1 are turned on. Transistor Q1 is turned off by the operation of signal 50 before transistor Q2 to initiate retrace. When transistor Q1 is turned off, it forms a retrace resonant circuit that includes deflection winding Ly and retrace capacitor C1. A resonant retrace pulse voltage V1 of FIG. 2b or of FIG. 3b, is developed at terminal 51 of winding Ly of FIG. 1. Retrace pulse voltage V1 at terminal 51 is coupled via a capacitor C3 to a junction terminal 70, at a junction of a cathode of a diode D3 and an anode of a diode D6. Thereby, voltage V1 is rectified by diode D3 and integrated via diode D6 in a capacitor C4. Capacitor C4 is coupled between terminal 52 and a cathode of diode D6, at a terminal 71. Diode D3 discharges capacitor C3, prior to retrace. The ratio between the capacitances of capacitors C4 and C3 determines the magnitude of a supply voltage VC4 that is developed in capacitor C4. Voltage VC4 is applied to a gate voltage of transistor Q2 for turning on transistor Q2.

Signal 50 that controls transistor Q1 is also applied via a controllable phase shifter formed by a pulse-width-modulator (PWM) controller 54 to produce a pulse signal 55 that is delayed with respect to signal 50. Pulse signal 55 is developed at the collector of a transistor Q8 and is coupled via a winding T1a of a pulse transformer T1 to a base of a switching transistor Q3. An emitter of transistor Q3 is coupled to terminal 52. A collector of transistor Q3 is coupled to the gate electrode of transistor Q2 via a resistor R1 for controlling a turn off instant of transistor Q2.

As long as signal 55 is at a LOW state, transistor Q3 does not conduct and the gate voltage of transistor Q2 produced from voltage VC4 in capacitor C4 maintains transistor Q2 turned on. At a controllable instant, during retrace, a transition to a HIGH state of signal 55 turns on transistor Q3. As a result, a gate-source capacitance, not shown, of transistor Q2 is discharged via resistor R1 and transistor Q3. Resistor R1 is coupled between the gate of transistor Q2 and the collector of transistor Q3. A fast on-to-off transition occurs in transistor Q2 because of the low resistance of resistor R1 and conducting transistor Q3. The fast on-to-off transition that occurs in transistor Q2 provides, advantageously, a low power dissipation or switching loss.

Thus, transistor Q2 is turned off after a variable or controllable delay time relative to a time transistor Q1 is turned off. The variable delay time is determined by the operation of PWM controller 54 operating as a controllable phase shifter that is controlled by a feedback signal 59. In each retrace interval RET of FIG. 2b or 2c, the integrated damper diode, not shown, in transistor Q2 of FIG. 1 becomes conductive before the integrated damper diode, not shown, in transistor Q1 becomes conductive by a time difference that is determined by the time difference between the respective turn off times of transistors Q2 and Q1.

When transistor Q2 is turned off, a retrace voltage V2 is generated in capacitor C2. A retrace pulse voltage across deflection winding Ly is equal to a sum signal V1+V2 of FIG. 2c or 3c of retrace pulse voltage V1, developed in retrace capacitor C1, and retrace pulse voltage V2, developed in retrace capacitor C2. Sum signal V1+V2 of FIG. 2c or 3c that is developed across winding Ly is larger than each of pulse voltages V2 and V1 of FIG. 1. Thereby, advantageously, the peak of pulse voltage V1, developed across switching transistor Q1, is substantially smaller than that of sum signal V1+V2 of FIG. 2c or 3c. Advantageously, a higher scan frequency can be employed to produce a given amplitude of deflection current iy of FIG. 1 without exceeding the breakdown voltage characteristic of switching transistor Q1 than if the arrangement of transistor Q2 and capacitor C2 were absent. Sum signal V1+V2 of FIG. 2c or 3c determines the average value of a voltage VCs in capacitor Cs. Voltage VCs determines an amplitude of deflection current iy.

For simplification, assume that the inductance of inductor Lb is large or infinite. Thus, the average value of voltage VCs in capacitor Cs has a maximum value when transistors Q1 and Q2 turn off simultaneously and can be expressed as:

$$\text{the average value of voltage } VCs = \frac{(\text{the value of voltage } B+) \cdot \times}{\left(1 + \frac{\text{the value of capacitor } C1}{\text{the value of capacitor } C2}\right)}$$

The term $$\left(1 + \frac{\text{the value of capacitor } C1}{\text{the value of capacitor } C2}\right)$$

represents a maximum value of a capacitive transformation factor. A minimum value of the capacitive transformation factor would be obtained if transistor Q2 were kept turned on throughout a retrace interval RET of FIG. 2b or 2c. In that case, capacitor C2 of FIG. 1 could be considered as an infinitely large capacitor, the minimum value of the capacitive transformation factor would be equal to 1 and the average value of voltage VCs would be equal to voltage B+. Thus, capacitive transformation is obtained. The capacitive transformation is, advantageously, variable or controllable by the operation of feedback signal 59.

Before a center of horizontal trace, not shown, signal 50 changes from a LOW state to a HIGH state, in a conventional manner. This causes transistors Q1 and Q6 to turn on. Therefore, transistors Q8 and Q3 are turned off. A current produced in resistors R1 and R2 by the voltage in capacitor C4 charges the gate-source capacitance, not shown, of transistor Q2, after the on-to-off transition in transistor Q3, at a rate determined by a time constant of resistor R2 and the gate-source capacitance, not shown, of transistor Q2. Therefore, a ramping-up gate voltage of transistor Q2 turns on transistor Q2, prior to a center of trace. A diode D5 limits the supply voltage developed in capacitor C4 and eliminates a voltage over-shoot at the gate of transistor Q2.

Variations in a supply current Is flowing in resistor Rb control a magnitude of a collector current iQ4 in a transistor Q4. Transistor Q4 has an emitter resistor R5 that is coupled to voltage B+ and a base electrode that is coupled between resistor Rb and inductor Lb. Current iQ4 provides a feedback signal that is proportional to the instantaneous value of supply current is in inductor Lb.

A collector current IQ5 in a transistor Q5 is controlled by an input control signal 60. Signal 60 is developed between a resistor R7 and a resistor R9 forming a DC voltage divider. A controllable signal HOR.AMPL. is coupled to terminal 60, located at the base of transistor Q5, via a resistor R8 for generating signal 60. Control signal 60 can be provided by, for example, a microprocessor, not shown. Control signal 60 can provide a fine adjustment at each selected horizontal deflection frequency.

A difference between collector current iQ4 in transistor Q4 and collector current iQ5 determines a magnitude of a control voltage VC6, developed across a current integration capacitor C6. Capacitor C6 provides high gain at low frequencies and an over-all stable operation. An East-West correction signal 61, coupled via a capacitor C7, is summed with voltage VC6 via a network formed by a resistor R11 and a resistor R6, respectively, to produce feedback control signal 59. East-West correction signal 61 provides East-West raster distortion correction.

PWM controller 54 includes a sawtooth generating transistor Q6. Square-wave signal 50 is capacitively coupled via a capacitor C8 and a forward biased diode D8 to a base of transistor Q6 to turn on transistor Q6 following a Low-to-High transition in signal 50. When transistor Q6 is turned on, a ramp producing capacitor C9 that is coupled to the collector of transistor Q6 is discharged. Following a High-to-Low transition in signal 50, transistor Q6 is turned off and capacitor C9 is charged via a transistor Q7 operating as an ideal current source to produce a ramp or sawtooth signal 57. A collector current in transistor Q7 is determined by an emitter resistor R14 of transistor Q7 and a voltage divider formed by a resistor R15 and a resistor R16 that are coupled in series. A junction terminal 56 between resistors R15 and R16 is coupled to the base of transistor Q7.

Feedback control signal 59 is developed at a non-inverting input terminal of a comparator 58. Sawtooth signal 57, developed in capacitor C9, is coupled to an inverting input terminal of comparator 58. A pulse-width modulated output signal 62 of comparator 58 is coupled via a resistor R17 and a diode D9 to a base of switching transistor Q8 to turn on transistor Q8 for generating pulse signal 55 having a controllable delay or phase relative to signal 50.

A pull-up resistor R18 is coupled between a supply voltage Vcc and a junction terminal 63, between resistor R17 and a cathode of diode D9. The emitter of transistor Q8 is coupled to voltage Vcc. A diode D10 has a cathode that is coupled to junction terminal 63 and an anode coupled to signal 50. Diode D10 prevents transistor Q2 from turning off before transistor Q1 by keeping the voltage at terminal 63 positive, as long as the voltage of drive signal 50 remains positive. A Low state of signal 62 does not turn on transistor Q8 as long as signal 50 is at a High state. Resistor R17 forms a load resistor for diode D10 and prevents signal 50 from being clamped by diode D10. Diode D9 produces an increase in a threshold level of transistor Q8 for providing immunity against level variations in drive signal 50.

An increase, for example, in an amplitude of deflection current iy in deflection winding Ly causes an increase in an average value of supply current Is that flows in resistor Rb. A resulting increase in current IQ4 causes voltage VC6 to increase. The increase in voltage VC6 further delays the turn off time of transistor Q2, during retrace, relative to that in transistor Q1. Thus, the capacitive transformation factor in deflection circuit 100 becomes smaller and causes both deflection current iy and supply current Is to decrease. Thereby, compensation is provided. On the other hand, a decrease in deflection current iy delays of the turn off time of transistor Q2 by a lesser amount, during retrace, relative to that in transistor Q1. Consequently, the capacitive transformation factor in deflection circuit 100 becomes larger in a manner to increase both deflection current iy and supply current Is.

When the selected horizontal deflection frequency fH is 31 KHz, transistor Q1 of FIG. 1 is turned off in the vicinity of time t1 of FIG. 2b and transistor Q2 of FIG. 1 is turned off in the vicinity of time t2 of FIG. 2a. Similarly, when the selected horizontal deflection frequency fH is 80 KHz, transistor Q1 of FIG. 1 is turned off in the vicinity of time t1' of FIG. 3b and transistor Q2 is turned off in the vicinity of time t2' of FIG. 3. The delay time, t1–t2, for example, from time t1 of FIG. 2b to time t2 of FIG. 2a is automatically adjusted by feedback signal 59 of FIG. 1 for producing the required amplitude of sum signal V1+V2 of FIG. 2c at the selected horizontal deflection frequency fH of 31 KHz. Delay time, t1–t2, of FIGS. 2b and 2a, respectively, is larger than a delay time, t1'–t2', of FIGS. 2b and 2a, respectively, to vary the capacitive transformation factor. For the same magnitude of deflection current iy at each selected horizontal frequencies, the ratio between retrace interval RET time of FIG. 2b or 3b and the remaining portion of the deflection period remains almost constant. The retrace time variation for 15% E/W-modulation is about of 200 ns at 31 kHz and 80 ns at 80 kHz.

In carrying out an inventive feature, because supply current Is is directly related to the amplitude of deflection current iy, the switching timing adjustment results in producing substantially the same amplitude of deflection current iy using the same supply voltage B+ at each selected deflection frequency. Thereby, gross adjustment of deflection current iy is obtained at each selected deflection frequency. Fine adjustment is obtained by the operation of aforementioned input control signal 60 for compensating mainly the differences of resistive loss in deflection winding Ly at the different deflection frequencies. Thereby, stability and accuracy are, advantageously, obtained.

An abrupt change in the horizontal deflection frequency can cause an undesirable transient condition or over swing in circuit 100. Therefore, switching transistors Q1 and Q2 might operate in their breakdown region until the negative feedback loop that produces signal 59 is again established in a steady state mode of operation. This might result in a temporarily higher dissipation in switching transistors Q1 and Q2. The increased dissipation is permissible, as long as the safe operating area (SOA) is not exceeded. This additional dissipation amount is marginally small because the loop will be in the out-of-lock condition for only a few ten's of milliseconds. This out-of-lock time is determined by the value of capacitor C6.

FIG. 1 illustrates an alternative current sensing arrangement 102. Arrangement 102 might be an advantageous alternative when inductor Lb is included in a flyback transformer, not shown, for producing a high voltage, not shown. Instead of sensing supply current Is, arrangement 102 senses the collector current in transistor Q1 using a current transformer T2. A primary winding T2a of transformer T2 is interposed between terminal 51 and collector terminal 51a of circuit 100. Retrace capacitor C1 is removed; instead, an identical retrace capacitor C1' is coupled to terminal 51a of winding T2a. Resistor Rb is bypassed by a conductor shown in broken line for applying voltage B+ to inductor Lb.

In arrangement 102, a rectifying diode D91, coupled to a terminal 81 of a winding T2b of transformer T2, and a rectifying diode D100, coupled to a terminal 72 of winding T2b, together with winding T2b produce a portion of rectified current iQ4', when deflection current iy is at a first polarity. Similarly, a rectifying diode D101, coupled to terminal 72 of winding T2b of transformer T2, and a rectifying diode D90, coupled to terminal 81 of winding T2b, produce rectified current iQ4', when deflection current iy is at the opposite polarity. Current iQ4' of arrangement 102 is coupled via terminal 82 to the collector of transistor Q5. Thus, current iQ4' is proportional to deflection current iy.

As an alternative, not shown, East-West correction signal 61 can be coupled via resistor R11 and capacitor C7 to the base electrode of transistor Q5. Another alternative is to provide isolation by an opto-coupler, not shown, instead of by transformer T1. In that case, the delay time of such opto-coupler should be as low as possible.

What is claimed is:

1. A video display deflection apparatus comprising:
   a first retrace capacitor;
   a second retrace capacitor;
   a deflection winding coupled to said first and second retrace capacitors to form a resonant circuit, during retrace;
   a source of a first control signal at a frequency related to a deflection frequency selected from a range of frequencies;
   a first switching transistor responsive to said first control signal and coupled to said first retrace capacitor for generating a first retrace pulse voltage in said first retrace capacitor;
   a second switching transistor responsive to a second control signal having a variable phase with respect to said first control signal and coupled to said second retrace capacitor for generating a second retrace pulse voltage in said second retrace capacitor, said first and said second retrace pulse voltages being applied to said deflection winding to produce a deflection current in said deflection winding; and
   a controllable phase shifter responsive to a feedback signal indicative of an amplitude of said deflection current for varying said phase of said second control signal relative to a phase of said first control signal to vary a retrace capacitor transformation factor in a manner to oppose a tendency of an amplitude of said deflection current to change; and
   a source of an input control signal indicative of a value of the selected frequency coupled to said controllable phase shifter for providing fine regulation of said deflection current amplitude at each of the selected frequencies.

2. The video display deflection apparatus according to claim 1, wherein said controllable phase shifter is also responsive to a modulation signal at a frequency related to a vertical deflection frequency to modulate a horizontal deflection current in said deflection winding for providing raster distortion correction.

3. The video display deflection apparatus according to claim 1, wherein said modulation signal provides East-West correction.

4. The video display deflection apparatus according to claim 1, wherein said controllable phase shifter comprises a pulse width modulator.

5. The video display deflection apparatus according to claim 1, further comprising a current transformer for producing said feedback signal.

6. The video display deflection apparatus according to claim 1, wherein said controllable phase shifter varies the retrace capacitance transformation factor in a manner to oppose a tendency of said amplitude of said deflection current to change when a change in the selected deflection frequency occurs.

7. A video display deflection apparatus, comprising;
   a first retrace capacitor;
   a second retrace capacitor;
   a deflection winding coupled to said first and second capacitors to form a resonant circuit, during retrace;
   a source of a first control signal at a frequency related to a deflection frequency selected from a range of frequencies;
   a first switching transistor responsive to said first control signal and coupled to said first retrace capacitor for generating a first retrace pulse voltage in said first retrace capacitor;
   a second switching transistor responsive to a second control signal having a variable phase with respect to said first control signal and coupled to said second retrace capacitor for generating a second retrace pulse voltage in said second retrace capacitor, said first and said second retrace pulse voltages being applied to said deflection winding to produce a deflection current in said deflection winding;
   a controllable phase shifter responsive to a feedback signal indicative of an amplitude of said deflection current for varying said phase of said second control signal relative to a phase of said first control signal to vary a retrace capacitor transformation factor in a manner to oppose a tendency of an amplitude of said deflection current to change; and
   a supply inductance coupled to a source of a supply voltage and to a junction terminal between said first and second retrace capacitances and a sensor coupled in series with said supply inductance for producing in said sensor said feedback signal.

* * * * *